(No Model.)
C. A. KOERNER.
LINE REEL.
No. 542,564. Patented July 9, 1895.
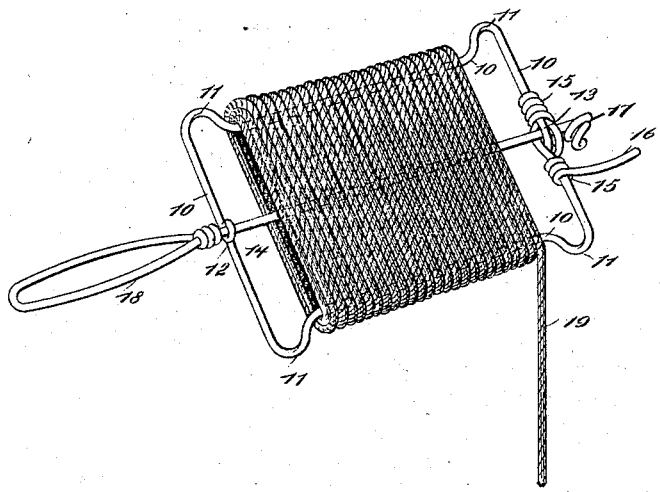
WITNESSES:
John A. Rennie
W. P. Hutchinson
INVENTOR
C. A. Koerner
BY
Munn & Co
ATTORNEYS.

UNITED STATES PATENT OFFICE.

CHARLES A. KOERNER, OF EVANSVILLE, INDIANA.

LINE-REEL.

SPECIFICATION forming part of Letters Patent No. 542,564, dated July 9, 1895.

Application filed October 24, 1894. Serial No. 526,859. (No model.)

*To all whom it may concern:*

Be it known that I, CHARLES A. KOERNER, of Evansville, in the county of Vanderburg and State of Indiana, have invented a new and Improved Line-Reel, of which the following is a full, clear, and exact description.

My invention relates to improvements in line-reels, and particularly to reels which are adapted to hold chalk-lines. These lines frequently come in hanks, so that they are with more or less difficulty straightened out and wound up for use; and the object of my invention is to produce a cheap and simple reel on which the lines may be conveniently wound ready for sale, and also to produce a reel which is very convenient for the user of the chalk-line, being constructed in such a way that it may be easily carried about the person, that it may be hung up if desired, that it may be readily wound and unwound, and that being made of wire it is cheap enough to come within the reach of all.

To these ends my invention consists of certain features of construction and combinations of parts, which will be hereinafter described and claimed.

Reference is to be had to the accompanying drawing, forming a part of this specification, which drawing is a perspective view of my improved line-reel with a line attached.

The reel 10 is of a generally-rectangular shape and is formed of wire, so that it may be cheaply made, and also be light and strong, and at the corners the reel is bent outward slightly, as shown at 11, so as to form guide-flanges to prevent the line from slipping off the reel ends.

The reel has at one end an eye 12, formed by doubling the wire of which the reel is made, and at the opposite end is an eye 13, these eyes 12 and 13 being adapted to receive the spindle 14, on which the reel turns, and the ends of the wire forming the reel are twisted together on opposite sides of the eye 13, so as to form the eye and fasten the wire ends; but one end 16 is left sticking out from the end of the reel at one side of its axis, thus forming a crank, by means of which the reel may be readily turned and the line wound upon it.

The spindle 14 has at the end which projects from the eye 13 a terminal knob 17, which prevents the spindle from being withdrawn from the eye, and at the other end of the reel the spindle is formed into a handle 18. The knob 17 may also be used to fasten the line when it is partly unwound, as the knob is formed by twisting up the wire of the spindle 14, and hence to fasten the line it may be pulled between the coils of the knob or wrapped once or twice around it. The line 19 is wound on the reel in the usual way between the end flanges 11, and when it is to be unwound the free end of the line is made fast and the reel carried from it, the operator holding the handle 18, while the reel in unwinding turns on the spindle 14. The reel may also be unwound in the reverse way by holding the handle and causing the line 19 to be pulled off the reel, which turns easily, so that the line is unwound with great facility.

The line is wound up by holding the handle 18 in one hand and with the other turning the reel, by means of the crank 16, in a direction to wind the line thereon. The reel may be used without the crank 16, if desired.

Having thus described my invention, I claim as new and desire to secure by Letters Patent—

1. As an improved article of manufacture, a line reel having a rectangular body portion formed of wire and bent at the corners to produce end flanges and also bent to form an eye between two corners one end of the wire sticking out at the end of the reel between the said eye and one of the corners to form a crank, and a handle pivotally connected with the body between the other corners and extending in line with the reel's axis of rotation, substantially as described.

2. A line reel having a rectangular body portion formed of wire and bent at the corners to produce end flanges and also bent to form eyes between the corners at the end portions of the body, and a spindle extending through the said eyes to form an axle for the body, said spindle being formed with a handle in alignment with the axle portion of the spindle, substantially as described.

CHARLES A. KOERNER.

Witnesses:
LOUIS KOESTER,
EMIL W. SAUPERS.